Feb. 18, 1947.  J. R. LEMON  2,415,894
POWER-TRANSMITTING DEVICE
Filed March 17, 1944   2 Sheets-Sheet 1
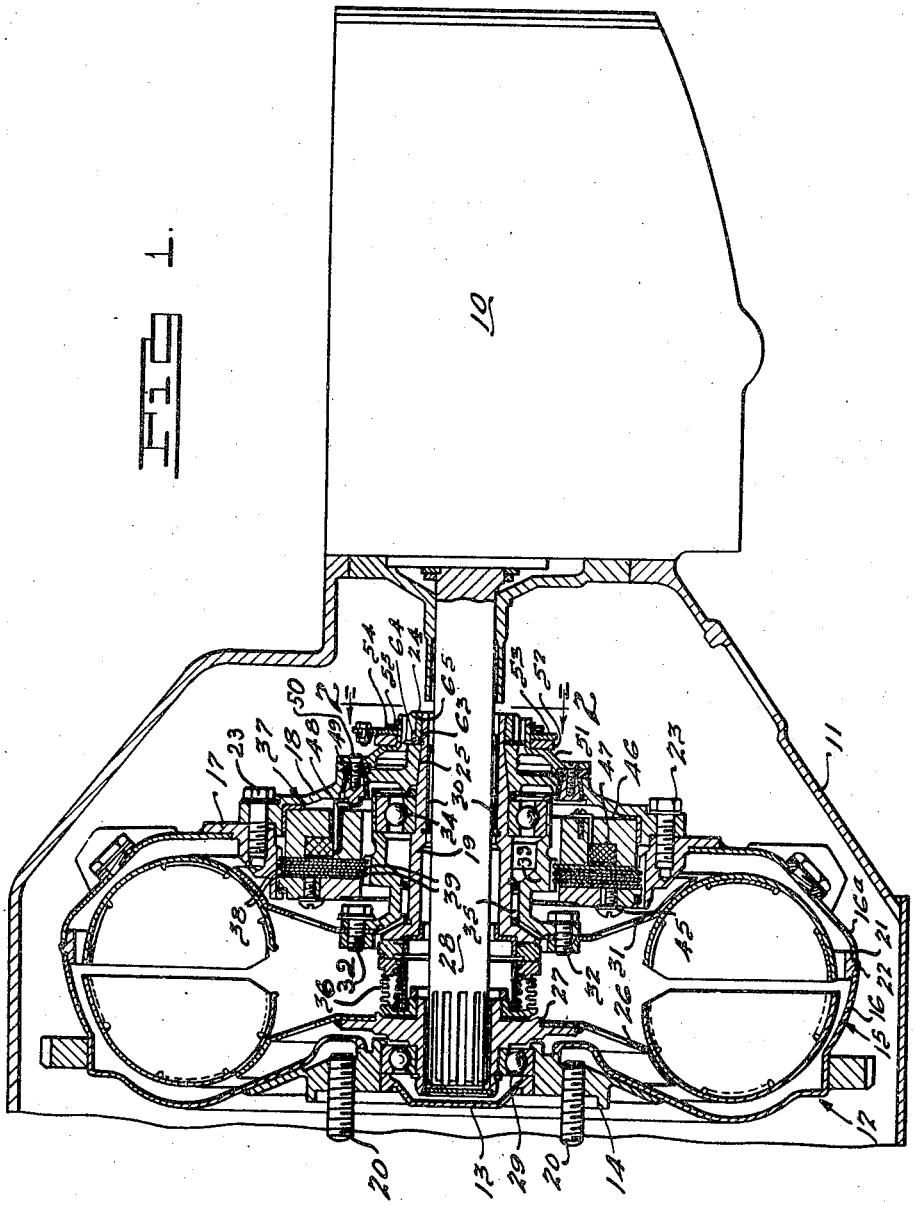
INVENTOR
JOSEPH R. LEMON
BY Harness and Harris
ATTORNEYS.

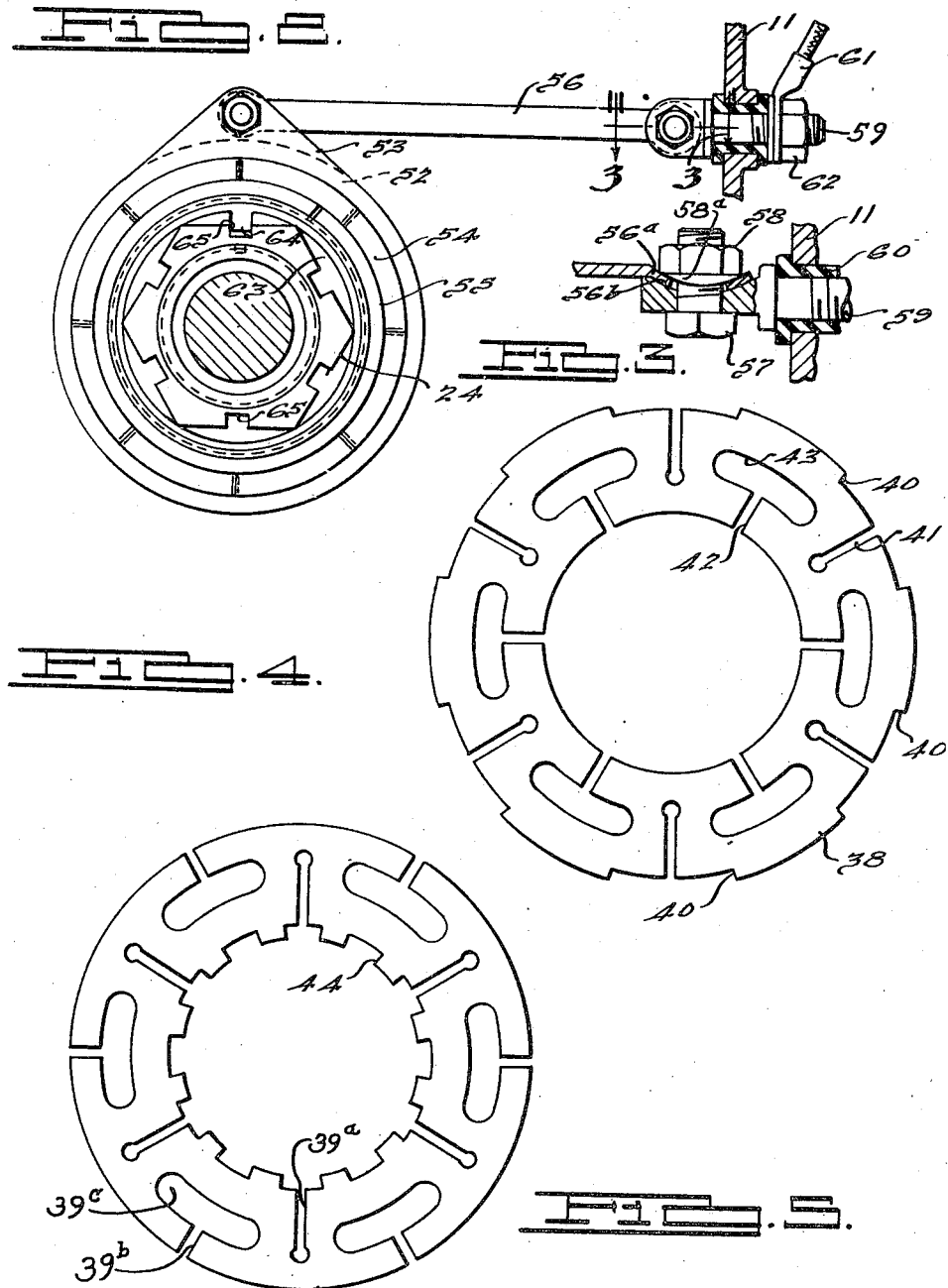

Patented Feb. 18, 1947

2,415,894

UNITED STATES PATENT OFFICE 2,415,894

POWER-TRANSMITTING DEVICE

Joseph R. Lemon, Detroit, Mich., assignor to Chrysler Corporation, Highland Park, Mich., a corporation of Delaware Application March 17, 1944, Serial No. 526,858

11 Claims. (Cl. 192—3.2)

1

This invention relates to the association of a clutch with a fluid coupling. More specifically it relates to the association of a magnetic clutch with a fluid coupling in such a manner that the coupling and clutch are carried within the same housing. The term "fluid coupling" as used herein is intended to cover any means by which power is transmitted through fluid, such means being a fluid coupling in the common accepted sense, a torque converter, or any like device.

It is, of course, known to associate a clutch and fluid coupling. However, when the clutch and fluid coupling are associated in such a way that disengagement of the clutch stops both the impeller structure and the runner structure of the clutch from rotating, the problem arises of satisfactorily sealing the fluid coupling from the clutch. If the clutch is of such a type that it will not function properly if the fluid of the fluid coupling comes into contact with it, then sealing may be so complicated that several seals are required. This is the case with the normal disc clutch. However, I have chosen to employ a magnetic clutch. This type of clutch has the advantage that fluid need not be excluded from it and, in fact, its operation may be improved if fluid comes into contact with it. Since fluid need not be excluded from the magnetic clutch, the problem of sealing is simplified.

An object of the present invention is to provide a clutch with a fluid coupling.

Another object is the provision of improvements in an arrangement of clutch and fluid coupling in which no part of the fluid coupling is driven by a normally driving member during disengagement of the clutch. In this arrangement a housing that contains the impeller and runner structures constituting the fluid coupling may be driven when the clutch is disengaged but neither impeller structure nor runner structure is driven at that time.

A further object is to simplify the sealing of associated clutch and fluid coupling.

Still another object is to associate a magnetic clutch with a fluid coupling. These parts are associated in such a way that they are contained in a common housing structure and the fluid of the fluid coupling comes into contact with the clutch and improves its operation. This arrangement makes possible the reduction of the overall length of fluid coupling and clutch and so brings about a reduction in vibration and unbalance.

Other objects will be apparent from the disclosure.

Fig. 1 is a view partially in section showing the

2 novel association of clutch and fluid coupling of the present invention;

Fig. 2 is a sectional view taken on the line 2—2 of Fig. 1;

Fig. 3 is a sectional view taken on the line 3—3 of Fig. 2; and

Figs. 4 and 5 are detail views showing plates forming part of the magnetic clutch employed in the present invention.

Reference character 10 designates a transmission casing adjacent to which is located a clutch housing 11. Within the clutch housing 11 is the unitary structural assembly 12 including a closure member 13, a fitting 14, a casing 15 formed of casing parts 16 and 16a, a ring 17, an end member 18, and a sleeve 19. The closure member 13 may be press-fitted within the fitting 14 which carries bolts 20 by means of which the structure assembly 12 is connected to an engine crankshaft, not shown. The casing part 16 is suitably secured to the fitting 14 as by soldering or welding and the casing part 16a is in turn connected to the casing part 16 by a ring 21 and by soldering or welding indicated at 22. The ring 17 is connected to the casing part 16 by soldering or welding and the end member 18 is secured to the ring 17 by bolts 23. The sleeve 19 is secured to the end member 18 by a nut 24, tapered surfaces indicated at 25 on the end member 18 and the sleeve 19 providing a tight securement of these parts. Positioned within the casing 15 is a runner structure 26 secured to a hub member 27 keyed to one end of a shaft 28. The other end of the shaft 28 extends into the transmission case 10. The hub 27 and the said one end of the shaft 28 are journalled upon the fitting 14 by means of a ball bearing 29. The sleeve 19 forming part of the unitary structure assembly 12 is journalled by means of needle bearings 30 upon an intermediate portion of the shaft 28. Positioned within the casing 15 is an impeller structure 31 adjacent the runner structure 26. The impeller structure 31 is secured by bolts 32 to a tubular member 33 journalled upon the sleeve 19 by means of a ball bearing 34 and roller bearings 35. A seal 36 acting between the hub 27 secured to the runner structure 26 and the sleeve 19 prevents fluid within the casing 15 acting between the impeller and runner structures 31 and 26 from coming in contact with the shaft 28.

A magnetic clutch 37 includes a set of alternate discs 38 keyed to the ring 17 and a set of alternate discs 39 keyed to the tubular member 33. Fig. 4 shows each clutch disc 38 to have notches 40 cut in its external periphery for key ing the discs to the tubular member 33. A radial slit 41 extends inwardly from each notch 40. A plurality of radial slits 42 extend outwardly from the inside of the disc 38 and terminate in enlarged openings 43. Fig. 5 shows each clutch disc 39 to have a plurality of notches 44 in its innner side by which it is keyed to the tubular member 33. Each disc 39 also has radial slots 39$^a$ extending outwardly from the inner periphery and radial slots 39$^b$ extending inwardly from the outer periphery and terminating in enlarged openings 39$^c$. Magnetic clutch 37 also includes an armature 45, a magnet 46 and a coil 47. Current is conducted to the coil 47 by a wire 48 connected to one of nuts 49, in turn connected to bolts 50, in turn connected to a supporting member 51. Mounted upon the supporting member 51 is a ring 52 which may be of graphite material. A metallic ring 53 rests against the ring 52. A spring ring 54, held in place by a retaining ring 55 and acting directly against the ring 53, presses the ring 52 into contact with the supporting member 51. The ring 53 is connected to a conducting strip 56, which has a curved perforated end 56$^a$, secured to a concave surface 56$^b$ in an end of an electrical connector 59 by a bolt 57 and a nut 58 having a convex end 58$^a$. The electrical connector 59 is mounted in an insulating member 60 in the clutch housing 11. An electrical lead 61 is attached to the connector 59 by a nut 62 threaded on the connector 59. A ring 63 held between the end member 18 and the nut 24 prevents entrance of dirt into the space between the end member 18 and the supporting member 51. A lug 64 pressed from the ring 63 into any one of a series of slots 65 in the nut 24 keys the ring 63 to the nut 24.

The drawings show the ring 52 and the supporting member 51 to contact over both a cylindrical area and an annular radial area. The radial area is the real current transmitting area, for wear of the ring 52 will not interfere with contact at this region.

During operation supplying of current to the magnetic clutch 37 causes the armature 45 to be attracted toward the magnet 46 so that the clutch plates 38 are in driving engagement with the clutch plates 39. Thus rotation of the casing 15 produced by rotation of the crankshaft acting through the bolts 20 is transmitted through the engaged magnetic clutch 37 to the tubular member 33 and the impeller structure 31. Rotation of the impeller structure 31 acts through the fluid contained in the casing 15 to rotate the runner structure 26 which acts through the hub member 27 to rotate the shaft 28 extending into the transmission casing 10. When drive is to be interrupted the magnetic clutch 37 is disengaged by interruption of the electric current flowing to the clutch. When this takes place the armature 45 is no longer attracted to the magnet 46 and the clutch plates 39 slip with respect to the clutch plates 38. When the clutch is thus disengaged the casing 15 housing the impeller and runner structures 31 and 26 rotates but these structures do not rotate. It will be apparent that the fluid within the casing 15 may reach the clutch plates 38 and 39 and when the clutch is disengaged the fluid helps the plates slip on one another so that disengagement is complete. It is also apparent that the problem of sealing the fluid coupling is very much simplified for only the single seal 36 is required since the clutch is housed within the parts to which the fluid of the fluid coupling has access.

As seen in Figs. 2 and 3 the conducting strip 56 is wide enough to resist rotation of ring 53 and thin enough to flex and so to permit axial movement of the ring 53. Furthermore, the securement of the conducting strip 56 to the electrical conductor 59 by the curved end 56$^a$ on strip 56, the convex end 58$^a$ on nut 58, and the concave surface 56$^b$ on conductor 59 permits a shifting of the angle of the conducting strip 56 to accommodate axial movement of the ring 53 toward the supporting member 51. Fig. 3 shows the opening in the curved end 56$^a$ of the conducting strip 56 to be somewhat larger than the diameter of the bolt 57 so that the curved end 56$^a$ can be shifted with respect to the nut 58 and the electrical conductor 59. Axial movement of the ring 53 may be due to wear between the ring 53 and the housing 51 or to movement of the entire assembly caused by vibration. Moreover, the shape and dimensions of the conducting strip 56 and the curved surfaces on nut 58 and connector 59 allows compensation for any lateral misalignment upon assembly between the ring 53 and the connector 59.

It is the intention to limit the invention only within the scope of the appended claims.

I claim:

1. A power-transmitting device comprising a rotatable driving member, a rotatable driven member, a fluid coupling comprising a casing and impeller and runner structures, a magnetic clutch comprising two sets of alternately placed plates and magnetic parts positioned on opposite sides of the sets of plates and attractable toward one another for pressing the sets of plates together for obtaining driving engagement therebetween, means connecting one set of plates to the casing, means connecting the other set of plates to one of the impeller and runner structures, means connecting the other of the impeller and runner structures to one of the driving and driven members, and means connecting the other of the driving and driven members to the casing.

2. A power-transmitting device comprising a rotatable driving member, a rotatable driven member, a fluid coupling comprising a casing and impeller and runner structures, means connecting one member to the casing, a clutch positioned within the casing and comprising plates of which some are connected to the casing and the remainder are connected to one structure, the plates being adapted to have driving engagement produced through opposed forces applied to press the plates against one another and to slip with respect to one another under the action of fluid of the fluid coupling upon removal of the forces, and means connecting the other structure to the other member.

3. A power-transmitting device comprising a rotatable driving member, a rotatable driven member, a fluid coupling comprising a casing and impeller and runner structures, means connecting one member to the casing, a clutch positioned within the casing, and comprising plates, some being connected to the casing and the remainder to one structure, the plates being adapted to be pressed together by magnetic forces for driving engagement and to slip on one another under the action of fluid of the fluid coupling upon removal of the forces, and means connecting the other structure to the other member.

4. A power-transmitting device comprising a fluid coupling having a rotatable casing and impeller and runner structures, a shaft having driving engagement at one end with one structure, a sleeve journalled on the shaft, means securing the sleeve to the casing, means journalling the other structure on the sleeve, a clutch positioned within the casing and connecting the casing and the said other structure.

5. A power-transmitting device comprising a fluid coupling having a rotatable casing and impeller and runner structures, a shaft having driving engagement at one end with one structure, a sleeve journalled on the shaft, means securing the sleeve to the casing, a member surrounding and journalled on the sleeve, means securing one structure to the member, means securing the other structure to the shaft, a clutch positioned within the casing so as to surround the member and connecting the casing and the member.

6. A power-transmitting device comprising a fluid coupling having a rotatable casing and impeller and runner structures, a shaft having driving engagement at one end with one structure, a sleeve journalled on the shaft, means securing the sleeve to the casing, a member surrounding and journalled on the sleeve, means securing the other structure to the member, a clutch positioned within the housing and comprising a plurality of plates some connected to the housing and some to the member, the clutch being engageable for driving through the action of forces pressing the plates together and disengageable for interrupting driving upon release of the said forces, the fluid within the fluid coupling coming into contact with the clutch plates.

7. A power-transmitting device comprising a fluid coupling having a rotatable casing and impeller and runner structures, a shaft having driving engagement at one end with one structure, a sleeve journalled on the shaft, means securing the sleeve to the casing, a member surrounding and journalled on the sleeve, means securing the other structure to the member, a magnetic clutch positioned within the housing and comprising a plurality of plates some connected to the housing and some to the member, and parts at opposite sides of the plates, the clutch being engageable for driving through pressing of the plates together by magnetic forces tending to bring the parts toward one another and being disengageable for interrupting driving upon release of the said forces, the fluid within the fluid coupling coming into contact with the clutch plates.

8. A power-transmitting device comprising a shaft, a unitary structural assembly surrounding the shaft and including a rotatable casing and a sleeve secured to the casing and journalled on and extending along the shaft within the casing, a fluid coupling comprising impeller and runner structures positioned within the casing, one structure being mounted on the sleeve and the other structure being connected to the shaft, a seal surrounding the shaft and extending between the other structure and the sleeve so as to seal the shaft from fluid acting between the impeller and runner structures, and a clutch positioned within the casing about the sleeve so as to connect the said one structure and the casing and including parts disengageable from one another for interruption of drive, the fluid within the fluid coupling coming into contact with the clutch plates.

9. A power-transmitting device comprising a shaft, a unitary structural assembly surrounding the shaft and enclosing an end thereof and including a rotatable casing and a sleeve secured to and extending within the casing along the shaft toward the said end thereof and being journalled on the shaft, a fluid coupling comprising impeller and runner structures, one structure being journalled on the sleeve and the other structure being connected to the said end of the shaft, means journalling the said other structure and the said end of the shaft on the casing, a seal extending between the sleeve and the said other structure so as to keep fluid acting between the impeller and runner structures away from the shaft, and a clutch operable in the fluid acting between the impeller and runner structures and positioned within the housing around the sleeve so as to connect the housing and the said one structure.

10. A power-transmitting device comprising a rotatable driving member, a rotatable driven member, a fluid coupling comprising a casing and impeller and runner structures, means connecting one member to the casing, a magnetic clutch positioned in the casing and connecting the casing and one structure, and means connecting the other structure to the other member.

11. A power-transmitting device comprising a rotatable driving member, a rotatable driven member, a fluid coupling comprising a casing and impeller and runner structures, means connecting the driving member to the casing, a magnetic clutch positioned in the casing and connecting the casing and the impeller structure, and means connecting the runner structure to the driven member.

JOSEPH R. LEMON.

REFERENCES CITED

The following references are of record in the file of this patent:

UNITED STATES PATENTS

| Number | Name | Date |
| --- | --- | --- |
| 1,689,244 | Klimek | Oct. 30, 1928 |
| 2,019,745 | Swennes | Nov. 5, 1935 |
| 2,184,606 | DeLavaud | Dec. 26, 1939 |
| 2,296,642 | Huebner, Jr. | Sept. 22, 1942 |

FOREIGN PATENTS

| Number | Country | Date |
| --- | --- | --- |
| 151,563 | Austrian | Nov. 25, 1937 |
| 450,034 | British | July 9, 1936 |